United States Patent
Gregory et al.

(10) Patent No.: US 6,295,392 B1
(45) Date of Patent: Sep. 25, 2001

(54) SUPER RESOLUTION METHODS FOR ELECTRO-OPTICAL SYSTEMS

(75) Inventors: Donald David Gregory, Allen; Peter Michael Mantica, Huntington, both of IN (US); Stephen Charles Cain, Cedarville, OH (US); Douglas Lent Cohen, Allen, IN (US); John Bourne Abbiss, Irvine, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/081,842

(22) Filed: May 20, 1998

(51) Int. Cl.$^7$ ....................................... G06K 9/20
(52) U.S. Cl. .............................................. 382/321
(58) Field of Search ................................. 382/312, 321, 382/254, 255, 264, 268, 269, 260, 299; 358/474, 488; 348/581, 597, 61; 367/45; 360/45; 359/189; 364/413.13, 724.1

(56) References Cited

U.S. PATENT DOCUMENTS

| | | | |
|---|---|---|---|
| 4,532,548 | * 7/1985 | Zwirn | 382/254 |
| 5,572,608 | * 11/1996 | Edgar | 382/321 |
| 5,771,317 | * 6/1998 | Edgar | 382/260 |
| 5,974,159 | * 10/1999 | Lubin et al. | 382/106 |

OTHER PUBLICATIONS

Bechou et al., "Improvement of Microassemblies Ultrasonic Images Using Adapted Signal Processing Techniques", IEEE/CPMT Int'l Electronics Manufacturing Technology Symposium, pp 457–462, 1997.*

Biggs et al., "Iterative Blind Convolution of Extended Objects", IEEE, pp. 454–457, 1997.*

Sung et al., "Nonlinear Restoration of Spatially Varying Blurred Images Using Self–Organizing Neural Network", IEEE, pp. 1097–1100, 1998.*

Handbook Series Linear Algebra, *Singular Value Decomposition and Least Squares Solutions*, G.H. Golub and C. Reinsch; Numer. Math. 14, 403–420 (1970).

*Practical Approximate Solutions to Linear Operator Equations When the Data are Noisy*, Grace Wahba; J. Numer. Anal., vol. 14, No. 4, pp. 651–667, Sep. 1997.

*Restoration of sub–pixel detail using the regularized pseudo–inverse of the imaging operator*, J.B. Abbiss and B.J. Brames; SPIE vol. 1566 Advanced Processing Algorithms, Architectures and Implementations II, pp. 365–375 (1991).

IEEE Transactions on Signal Processing, *Superresolution Algorithms for a Modifed Hopfield Neural Network*, J.B. Abbiss, B.J. Brames and M.A. Fiddy, vol. 39, No. 7, Jul. 1991.

(List continued on next page.)

Primary Examiner—Jose L. Couso

(57) ABSTRACT

There is disclosed in an optical system having a predetermined Numerical aperture which provides a corresponding level of spatial resolution and having detector means and processor means in which image data is obtained comprising noisy blurred scene data containing an object to be reconstructed, and noisy blurred background data of the same scene, an improved method for increasing the spatial resolution of the imaging data produced by the diffraction limited optical system. The improvement comprises filtering the noisy blurred background data of the same scene to obtain noise suppressed data; applying estimations of point spread functions associated with the noise suppressed data and optical system to estimates of the noise suppressed data to obtain a reconstructed background image ($I_r(x)$); and low pass filtering the noisy blurred scene data containing the object to be reconstructed (D1) and using the reconstructed background image ($I_r(x)$) to eliminate the background data from the image data to obtain a reconstructed image of an object with increased spatial resolution.

34 Claims, 17 Drawing Sheets

OTHER PUBLICATIONS

Titan Spectron, Tustin, California, *Fast regularised deconvolution in optics and radar,* J.B. Abbiss, J.C. Allen, R.P. Bocker and H.J. Whitehouse, pp. 421–445.

AM Review, *Analysis Of Discrete Ill–Posed Problems By Means Of The L–Curve,* Christian Hansen, vol. 34, No. 4, pp. 561–580, Dec. 1992.

* cited by examiner

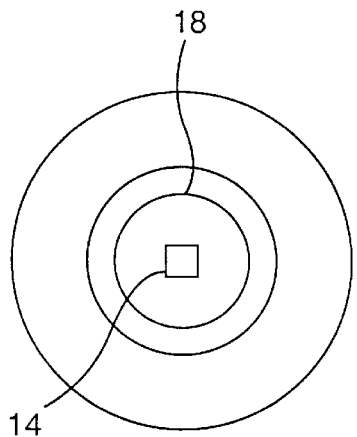
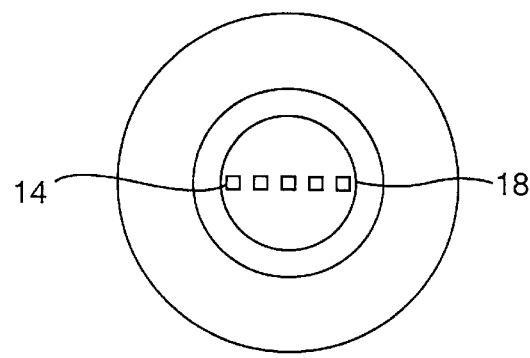
FIG. 4  FIG. 5
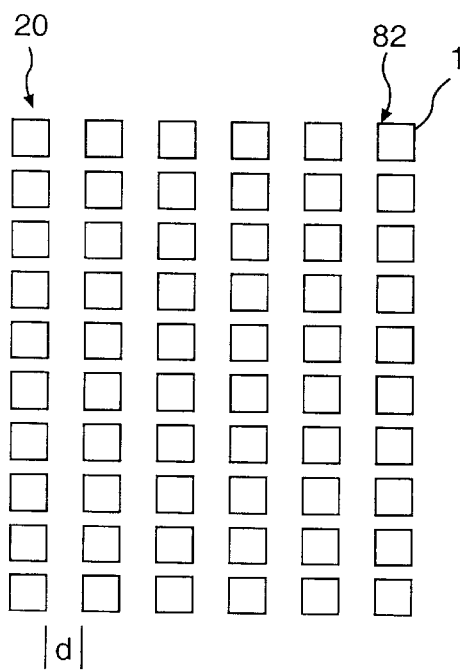
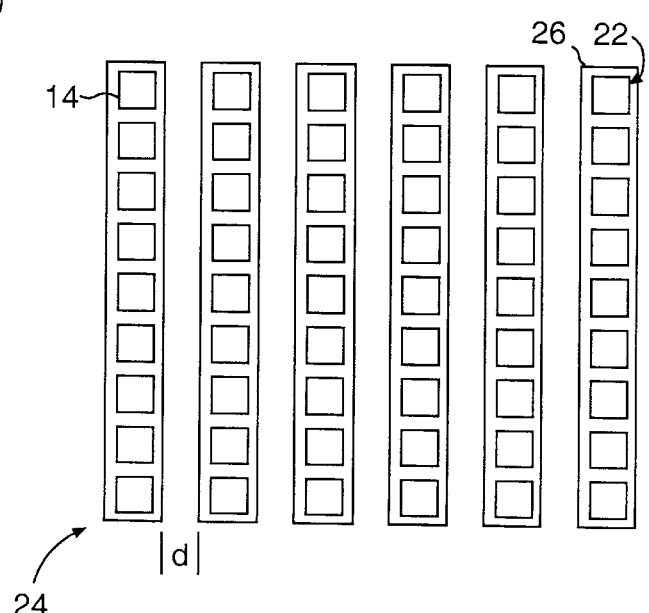
FIG. 6  FIG. 7

FIG. 16C SUPER RESOLVED IMAGE
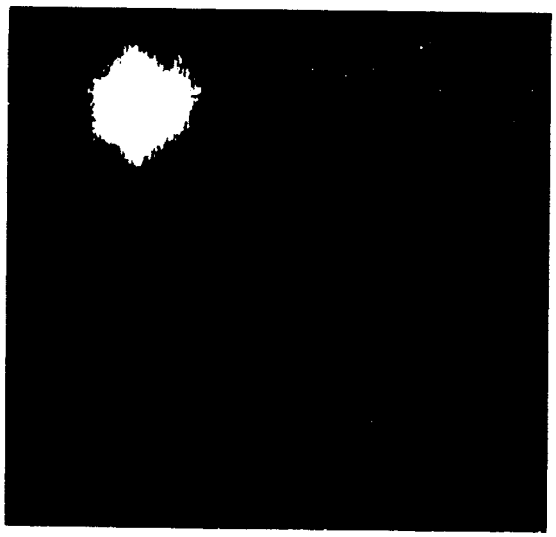
FIG. 16B BLURRED IMAGE (THINNED APERTURE, ANNULUS CONFIGURATION)
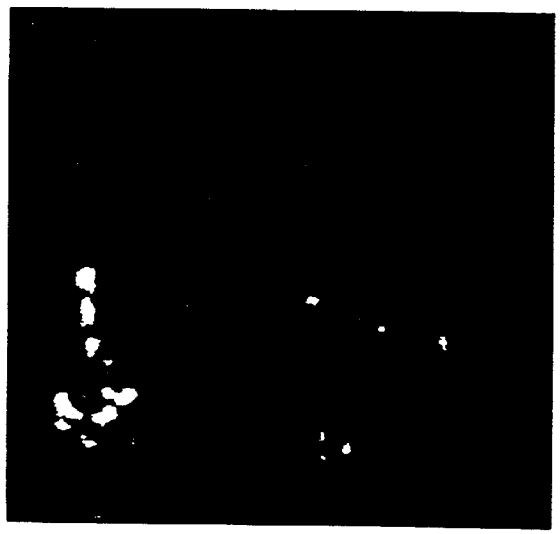
FIG. 16A TRUTH IMAGE

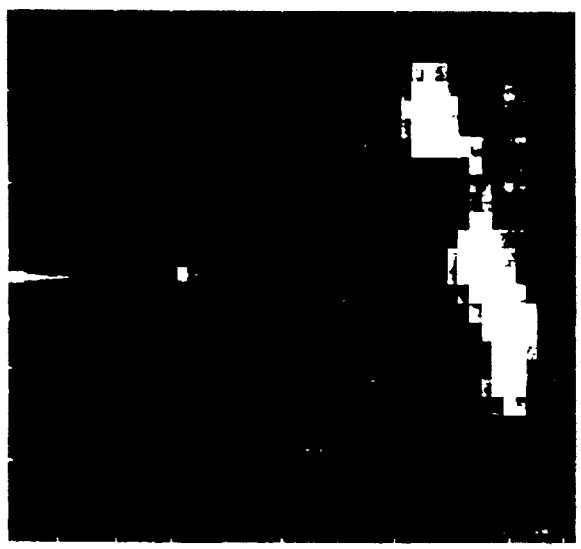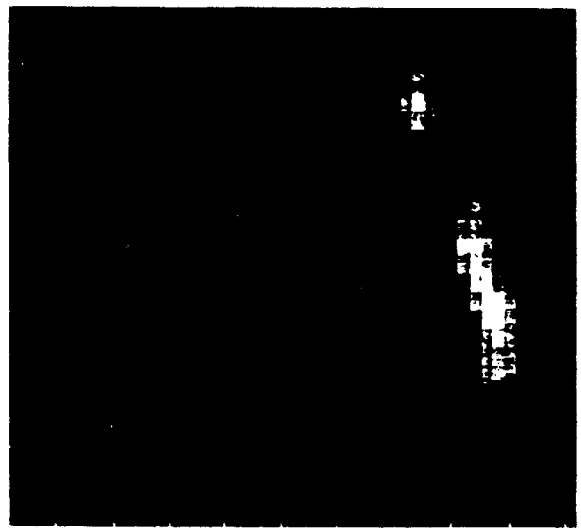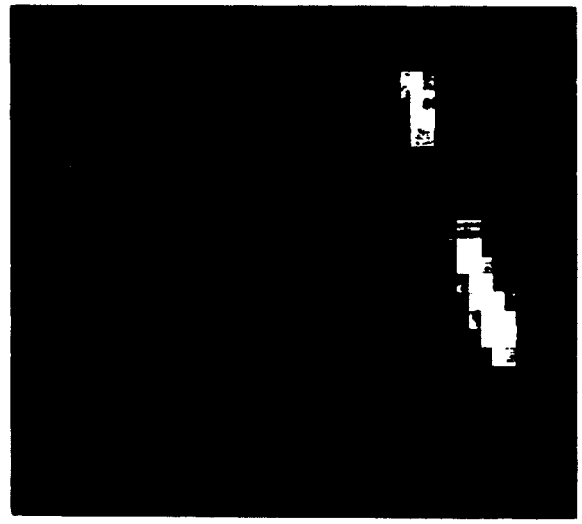

SUPER RESOLVED FIGURE
ADD FREQS, MORE BLACK AGREES WITH TRUTH

DECONVOLVED FIGURE
DOESN'T ADD NEW FREQS, ENHANCES

BLURRED FIGURE $g_1$ IS THE BLURRED SCENE CONTAINING THE BACKGROUND AND THE OBJECT OF INTEREST:

$g_1(i, j) = \sum_{mn}\sum h(i-m, j-n)f(m, n) + n_1(i, j)$,    $(i = 1, 2, ... I; j = 1, 2, ... J)$ WHERE    $h$ IS THE POINT-SPREAD FUNCTION OF THE OPTICAL SYSTEM $f$ IS THE (UNBLURRED) BACKGROUND WITH EMBEDDED OBJECT $n_1$ IS THE ADDITIVE SYSTEM NOISE $g_2$ IS THE BLURRED SCENE CONTAINING THE BACKGROUND ONLY:

$g_2(i, j) = \sum_{mn}\sum h(i-m, j-n)b(m, n) + n_2(i, j)$,    $(i = 1, 2, ... I; j = 1, 2, ... J)$ WHERE    $b$ IS THE (UNBLURRED) BACKGROUND ALONE $n_2$ IS THE ADDITIVE SYSTEM NOISE

LOW PASS

FORM $(g_1 - g_2)$

SPECIFY POSITION AND SIZE OF THE OBJECT OF INTEREST

EXTRACT FROM $(g_1 - g_2)$ A SEGMENT OF SUFFICIENT SIZE TO CONTAIN THE BLURRED OBJECT COMPLETELY (i.e., AN AREA EQUAL TO THE TRUE EXTENT OF THE OBJECT PLUS ITS DIFFRACTED ENERGY)

EXTRACT FROM $g_2$ AN IDENTICALLY-LOCATED SEGMENT

RESTORE THE TWO SEGMENTS USING $n^{th}$ ORDER TIKHONOV REGULARIZATION

ADD THE TWO RESTORED SEGMENTS

EXTRACT THE AREA CONTAINING THE RESTORED OBJECT OF INTEREST

*FIG. 19*

SUPER RESOLUTION METHODS FOR ELECTRO-OPTICAL SYSTEMS

RELATED APPLICATIONS

The present application is related to copending commonly assigned U.S. patent application Ser. No. 08/763,610, filed on Dec. 11, 1996, entitled "Apparatus and Method For Providing Optical Sensors With Super Resolution", incorporated herein by reference.

FIELD OF THE INVENTION

The present invention relates generally to optical devices, and more particularly to an optical sensor utilizing background reconstruction image processing techniques in order to provide a much higher level of resolution of a localized object within a background scene.

BACKGROUND OF THE INVENTION

Optical sensors are devices which for decades have been used to detect and record optical images. Various types of optical sensors have been developed which work in the Ultra Violet Bands, Infra Red Bands as well as in the Visible Bands of operation. Examples of such devices include Weather Sensors, Terrain Mapping Sensors, Surveillance Sensors, Medical Probes, Telescopes and Television Cameras.

An optical sensor typically includes an optical system and one or more detectors. The optical system portion is made up of various combinations of lenses, mirrors and filters used to focus light onto a focal plane located at the image plane of the optical system. The detectors which make up the image plane are used to convert the light received from the optical system into electrical signals. Some types of optical sensors use film rather than detectors to record the images. In this case, the grain size of the film is analogous to the detectors described above.

An important performance characteristic of optical sensors is their "spatial resolution" which is the size of the smallest object that can be resolved in the image or, equivalently, the ability to differentiate between closely spaced objects. If the optical system is free from optical aberrations (which means being "well corrected") the spatial resolution is ultimately limited by either diffraction effects or the size of the detector.

Diffraction is a well known characteristic of light which describes how light passes through an aperture of an optical system. Diffraction causes the light passing through an aperture to spread out so that the point light sources of a scene end up as a pattern of light (known as a diffraction pattern) diffused across the image. For a well corrected, unobscured optical system known as a diffraction limited system, the diffraction pattern includes a very bright central spot, surrounded by somewhat fainter bright and dark rings which gradually fade away as the distance from the central spot increases.

An optical sensor that is designed to be diffraction limited usually has a very well corrected optical system and detectors sized so that the central spot of the diffraction pattern just fits within the active area of the detector. With conventional sensors, making the detectors smaller does not improve resolution and considerably increases the cost due to the expense of the extra detectors and the associated electronics.

The size of the aperture used in the optical system determines the amount of resolution lost to diffraction effects. In applications such as camera lenses and telescope objectives, the aperture size is normally expressed as an f-number which is the ratio of the effective focal length to the size of the clear aperture. In applications such as microscope objectives, the aperture size is normally expressed as a Numerical aperture (NA) which is the index of refraction times the sine of the half angle of the cone of illumination. For a given focal length, a high f-number corresponds to a smaller aperture, while a higher Numerical aperture corresponds to a larger aperture.

A basic limitation of conventional optical sensors is the aperture size required for a given level of resolution. Higher resolution images require larger apertures. In many situations the use of such a system is very costly. This is because using a larger aperture requires a significantly larger optical system. The cost for larger systems which have apertures with diameters greater than one foot is typically proportional to the diameter of the aperture raised to a power of "x". The variable "x" usually ranges from 2.1 to 2.9 depending on a number of other particulars associated with the sensor such as its wave band, field of regard, and field of view.

The size of the optical sensor is particularly relevant for systems that fly on some type of platform, either in space or in the air. Under such conditions the sensor must be light weight, strong, and capable of surviving the rigors of the flight environment. Thus the cost of going to a larger optical system can be in the hundreds of millions of dollars for some of the larger and more sophisticated sensors. Practical considerations, such as the amount of weight the host rocket, plane, balloon, or other vehicle can accommodate, or the amount of space available, may also limit the size of the sensor. These practical considerations can prevent a larger system from being implemented no matter how large the budget.

A number of optical imaging techniques have been developed to increase spatial resolution. One such technique is known as sub-pixel resolution. In sub-pixel resolution the optical system is limited in spatial resolution not by diffraction but by the size of the detectors or pixels. In this case, the diffraction pattern of the aperture is much smaller than the detectors, so the detectors do not record all the resolution inherent in the optical system's image. Sub-pixel resolution attempts to reconstruct an image that includes the higher resolution not recorded by the detectors. This technique does not require hardware or system operation changes in order to work. Examples of sub-pixel resolution techniques are disclosed in an article in ADVANCED SIGNAL PROCESSING ALGORITHMS, ARCHITECTURES AND IMPLEMENTATIONS II, by J. B. Abbiss et al., The International Society For Optical Engineering, Volume 1566, P. 365 (1991).

Another example is the use of "thinned aperture" systems where for example, a widely-spaced pattern of small holes is used as a substitute for the complete aperture. However, even "thinned apertures" are limited in resolution by diffraction theory and by the outer diameter of the widely-spaced pattern of small holes. Note that current electro-optical systems are sometimes designed so that the size of their detector matches the size of the diffraction blur of their optics.

Other examples of optical imaging techniques are disclosed in an article entitled SUPER RESOLUTION ALGORITHMS FOR A MODIFIED HOPFIELD NEURAL NETWORK, by J. B. Abbiss et al., IEEE Transactions On Signal Processing, Vol. 39, No. 7, July 1991 and in a paper entitled FAST REGULARIZED DECONVOLUTION IN OPTICS AND RADARS, by J. B. Abbiss et al., presented at the 3rd IMA Conference on Mathematics in Signal Processing. These techniques use linear algebra and matrix techniques to restore signals or images from a limited discrete data set.

The previously described techniques have a number of drawbacks with regard to optical sensors. First, only one of these techniques is directed toward a diffraction limited device. In addition, these techniques often produce systems of equations which cannot be solved due to the practical constraints on computing power. Furthermore, none of the previously described techniques specify either the types of detectors or other system parameters which are used along with these techniques.

It is, therefore, an object of the present invention to provide a technique for optimally increasing the resolution of an optical sensor that is diffraction limited (using super-resolution techniques) without using a substantially larger aperture.

SUMMARY OF THE INVENTION

The invention provides a method of improving the spatial resolution of an object using a background reconstruction approach wherein a localized object containing high spatial frequencies is assumed to exist inside a background scene containing primarily low and/or very high spatial frequencies compared to the spatial frequencies of the localized object. The imaging system cannot pass these high spatial frequencies (neither the high frequencies of the object, nor the very high frequencies of the background). The background image's low spatial frequencies are used to reconstruct the background scene in which the localized object is situated. Using this reconstructed background and the space limited nature of the localized object (i.e. it is only present in part of the scene, not the entire scene), the high spatial frequencies that did not pass through the optical system are restored, reconstructing a detailed image of the localized object.

The improvement comprises filtering the noisy blurred background data of the same scene to obtain noise suppressed data; applying estimations of point spread functions associated with the noise suppressed data and optical system to estimates of the noise suppressed data to obtain a reconstructed background image ($I_r(x)$); and low pass filtering the noisy blurred scene data containing the object to be reconstructed (D1) and using the reconstructed background image ($I_r(x)$) to eliminate the background data from the image data to obtain a reconstructed image of an object with increased spatial resolution.

BRIEF DESCRIPTION OF THE DRAWINGS

The above objects, further features and advantages of the present invention are described in detail below in conjunction with the drawings, of which:

FIG. 4 is a diagram illustrating the size of an individual detector tailored to the present invention;

FIG. 5 is a diagram illustrating how the detector grid is sized with respect to the central diffraction lobe;

FIG. 6 is a diagram of a multi-linear detector array tailored to the present invention;

FIG. 7 is a diagram of another version of a multi-linear detector array tailored to the present invention;

FIGS. 16A–C show simulated images associated with a thinned aperture optical system configuration using non-linear method.

FIGS. 17A–C show the super-resolution of an image of a figure taken from a CCD camera and reconstructed using the non-linear method according to the invention;

FIG. 19 is a flow diagram of the linear algebra background reconstruction technique according to the present invention.

DETAILED DESCRIPTION OF THE INVENTION

The present invention is directed to a method of super-resolution of an image for achieving resolutions beyond the diffraction limit. This is accomplished by a method of background reconstruction, wherein a localized object containing high spatial frequencies is assumed to exist inside a background scene containing primarily low and/or very high spatial frequencies compared to the spatial frequencies of the localized object. The point spread function (PSF) of an optical system causes the background data to blend with and flow over objects of interest, thereby contaminating the boundaries of these objects and making it exceedingly difficult to distinguish these objects from the background data. However, if one knows or can derive the background, then the object may be disentangled from the background such that there will exist uncontaminated boundaries between the object and the background scene. Another way of describing the effect of a PSF is to note that the spatial frequencies associated with the object of interest which lie beyond the optical system cutoff frequency are lost. In the background reconstruction approach, a localized object such as a tractor having high spatial frequencies is super-resolved inside a background scene containing primarily low and/or ultra-high spatial frequencies such as a cornfield. Typically, the imaging system cannot pass either the high spatial frequencies of the object or the ultra-high spatial frequencies of the background. This invention uses the background images' low spatial frequencies to reconstruct the background scene in which the localized object is situated. This reconstructed background and the space limited nature of the localized object (that is, the object is present in only part of the scene rather than the entire scene) can be used to restore the high spatial frequencies that did not pass through the optical system, thereby reconstructing a detailed image of the localized object.

In accordance with alternative embodiments of the present invention, both linear and nonlinear methods for reconstructing localized objects and backgrounds to produce super-resolved images are described.

Figure 1:
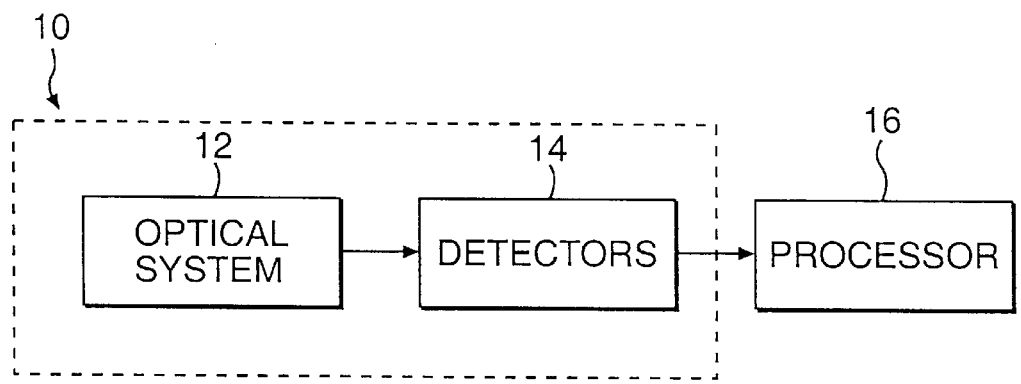
FIG. 1 is a general block diagram of the optical sensor according to the present invention.

Referring to FIG. 1, there is shown a general block diagram of an optical sensor accommodating the present invention. The sensor (10) as in conventional devices includes an optical system (12) and detectors (14). The optical system (12) which includes various combinations of lenses, mirrors and filters depending on the type of application is used to focus light onto a focal plane where the detectors (14) are located. The optical system (12) also includes a predetermined aperture size corresponding to a particular Numeral aperture (NA) which, in conventional diffraction-limited devices, limits the amount of spatial resolution that is attainable. This is, as previously described, due to diffraction blurring effects.

The optical system (12) can be described by an optical transfer function (OTF) which represents the complete image forming system, and which can be used to characterize that system.

The detectors (14) convert the light received from the optical system (12) into the electrical signals which become the data used to generate images. In conventional sensors the detectors are configured in a linear array for Scanning systems or in a matrix array for Staring systems. In Scanning systems, the detector linear array is swept in a direction perpendicular to the length of the array generating data one scan line at a time with each line corresponding to one line of the image. In Staring systems the matrix array is not moved and generates all of the imaging data simultaneously. Thus each detector of the matrix array corresponds to one pixel of the image. It is intended that the detectors (14) of the present invention will be configured as a linear array or a matrix array depending on the type of system being used.

The detectors (14) take many different forms depending on the wavelength of light used by the present invention. For example, in the ultraviolet and X-Ray ranges such detectors as semitransparent photocathodes and opaque photocathodes can be used. In the visible range such detectors as vacuum phototubes, photomultipliers, photoconductors, and photodiodes can be used. In the infrared range, such detectors as photoconductors, photodiodes, pyroelectric, photon drag and golay cell devices can be used.

In the present invention various elements of the sensor (10) must be optimized to be used with a particular image-processing technique. The type of optimization depends on the image-processing technique. As will be described in detail later, the present invention includes two alternative image-processing techniques. Each of these two super-resolution methods may be used with the sensor configurations as described below.

In case one, the sensor (10) must include detectors (14) that have an "instantaneous field of view" that is equal to or less than the desired level of spatial resolution. If, for example, the required resolution is one meter or less then the "instantaneous field of view" of the detectors must be one meter or less (even though the central lobe of the diffraction pattern is much larger). This makes the pixel size of the image produced by the sensor (10) smaller than the central diffraction lobe. (Note that, such a configuration adds additional cost to the sensors. However, for large systems the increase in cost is less than the cost of a larger aperture.)

The sensor (10) can obey this rule in one of two ways. One way is to use more smaller-size detectors (14). In conventional sensors the number of detectors used varies anywhere from one to millions depending on the application.

Figures 2, 3:
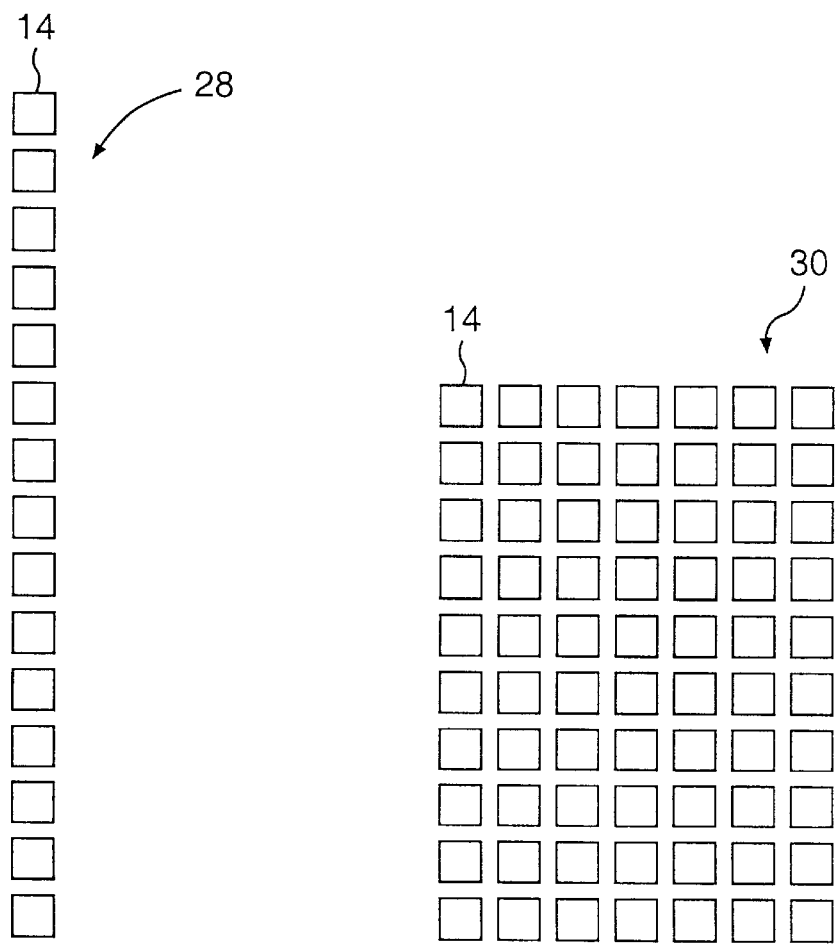
FIG. 2 is a diagram of a linear detector array tailored to the present invention.
FIG. 3 is a diagram of a matrix detector array tailored to the present invention.

In one embodiment of the present invention at least five times more detectors (14) than normal are required to achieve the desired resolution. A diagram of a linear detector array to be used with the present invention is shown in FIG. 2, while a diagram of a matrix detector array to be used with the present invention is shown in FIG. 3. The number of detectors (14) included in these arrays (28),(30) depends on the application. However, as previously pointed out to achieve the higher resolution these arrays (28),(38) will include at least five times more detectors (14) than conventional sensors for a given application.

In conventional sensors, the size of the individual detector is never smaller than the size of the central diffraction lobe. This is because utilizing smaller sensors serves no purpose since the resolution is limited by the optical aperture. In the present invention, the size of the individual detectors (14) must be smaller than the size of the central diffraction lobe (18), as shown in FIG. 4.

Another way of configuring the sensor (10) according to Case one is again to use a larger number of detectors (14), but instead of using smaller detectors configure the optical system (12) so that more than one detector is spread across the central diffraction lobe. This allows conventional size detectors (14) to be used. The number of detectors (14) used again must be five times or more than required in conventional sensors. In order to configure the optical system (12) as described above the back focal length must be adjusted so that five or more detectors (14) spread across the central diffraction lobe (18), as shown in FIG. 5.

In Scanning systems, it is difficult to generate multiple image data by viewing the object at different times. This is because the optical system assumes that the object remains stationary while being scanned. The solution is to use detectors (14) configured in a multi-linear array as shown in FIG. 6. The multi-linear array (20) includes a number of individual linear arrays (22) shifted parallel to each other by a distance (d) which is a fraction of a pixel. When the array (20) is swept each linear array (22) generates imaging data corresponding to one scan line of each of the images. Thus each linear array (22) creates one of the images being produced. In the preferred configuration, the array (20) includes ten or more individual linear arrays 22 which are capable of producing ten or more different images.

Now two more examples of this technique are discussed. These examples are labeled Case three and Case four.

In Case three, the sensor (10) is configured to take images of objects in multiple color bands. In Scanning systems, this is accomplished by utilizing a multi-linear array, as shown in FIG. 7. The multi-linear array (24) also includes a number of individual linear arrays (22) arranged in a parallel configuration shifted parallel to each other by a distance (d) which is a fraction of a pixel. A color filter (26) is disposed over each of the linear arrays (22). The color filters (26) are configured to pass only a particular portion of the color spectrum which may include multiple wavelengths of visible light. When the array (24) is swept, each linear array (22) produces images of the same object in different color bands. The filters (26) are fabricated by depositing optical coatings on transparent substrates, which are then placed over each of the linear arrays (22). This process is well known.

Figure 8:
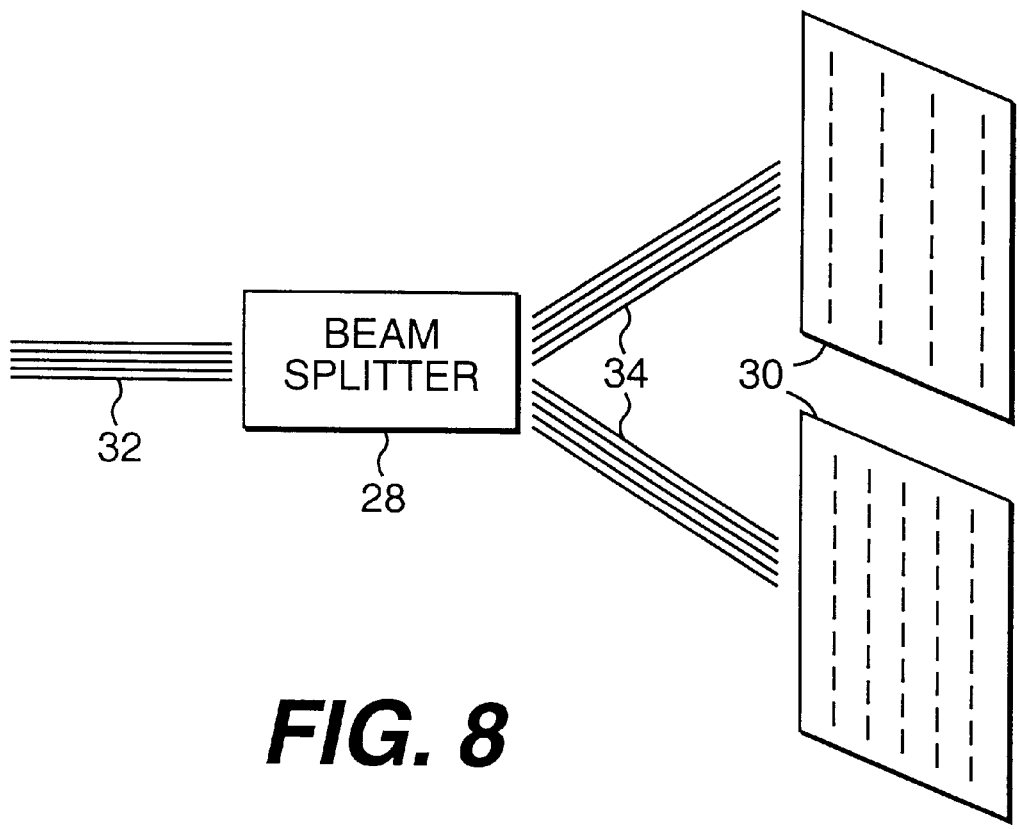
FIG. 8 is diagram illustrating the operation of a beam splitter as part of an optical system tailored to the present invention.

In Staring systems, the multiple color-band data is created by incorporating a beam splitter in the optical system (12) and using multiple detector arrays. Such a configuration is illustrated in FIG. 8. The beam splitter (28) splits the incoming light (32) into multiple beams (34); FIG. 8 shows the basic idea using a two-beam system. Due to the operation of the beam splitter (28) each light beam (34) includes a different part of the color spectrum which may include one or more different bands of visible or infrared light. Each light beam is directed to one of the detector arrays (30) producing images of the same object in different color bands.

In Case four, the sensor (10) is a combination of the three previously described cases. This is accomplished by combining the principles discussed above with regard to Cases one, two or three. In all three cases the sensor must be designed to have a signal to noise ratio which is high as possible. This is done either by increasing the integration time of the detectors (14) or by slowing down the scan speed as much as possible for scanning systems. For Case two, the system's design, or its operation mode, or both, are changed in order to take the required multiple images in a known pattern displaced by a known distance that is not a multiple of a pixel, but rather is a multiple of a pixel plus a known fraction of a pixel.

Referring back to FIG. 1, coupled to the detectors (14) is a processor (16) which processes the image data to achieve the higher resolution. This done by recovering "lost" information from the image data. Even though the diffraction blur destroys the required spatial resolution, some of the "lost" spatial information still exists spread across the focal plane. The small-size detectors described above are used to sample at a 5 to 10 times higher rate than is customary in these sorts of optical systems in conjunction with processing enabling much of this "lost" information to be recovered and thus restoring the image to a higher level of resolution than classical diffraction theory would allow.

The processor (16) uses one of two image processing techniques: a Non-linear Reconstruction method using a modified Richardson-Lucy Enhancement technique, and a background reconstruction approach using a linear algebra technique.

One reasonable extension of the previously described imaging techniques is to use phase retrieval or wave front phase information to reconstruct the image and thus achieve higher resolution. Another reasonable extension of the previously described technique is to use prior knowledge of the background scene to help resolve objects that have recently moved into the scene. The processor (16) in addition to using one of the above described primary data processing techniques, also uses other techniques to process further the imaging data. This further processing is accomplished by standard image enhancement techniques which can be used to improve the reconstructed image. Such techniques include, but are not limited to, edge sharpening, contrast stretching or other contrast enhancement techniques.

Figure 9A:
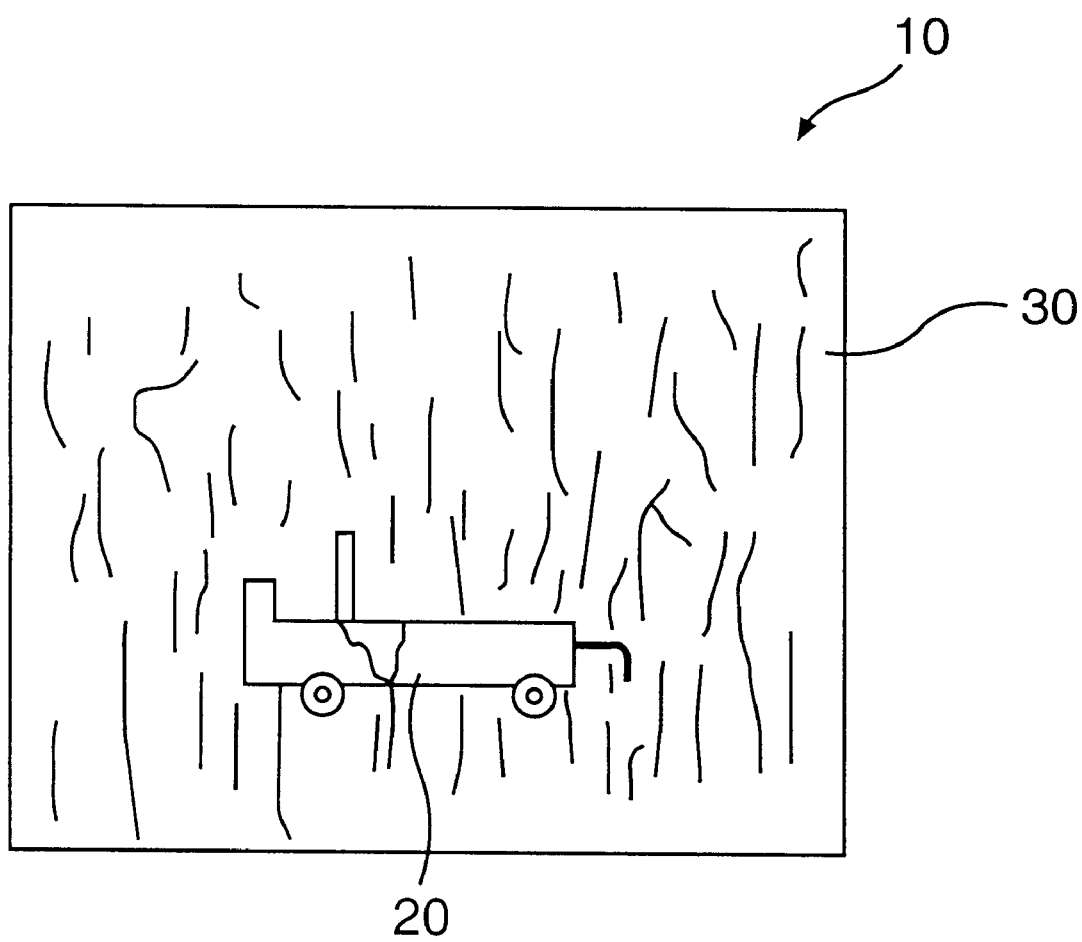
FIGS. 9A–B represents an image scene and a flow diagram of the non-linear background reconstruction technique of the image scene according to the present invention.
Figure 9B:
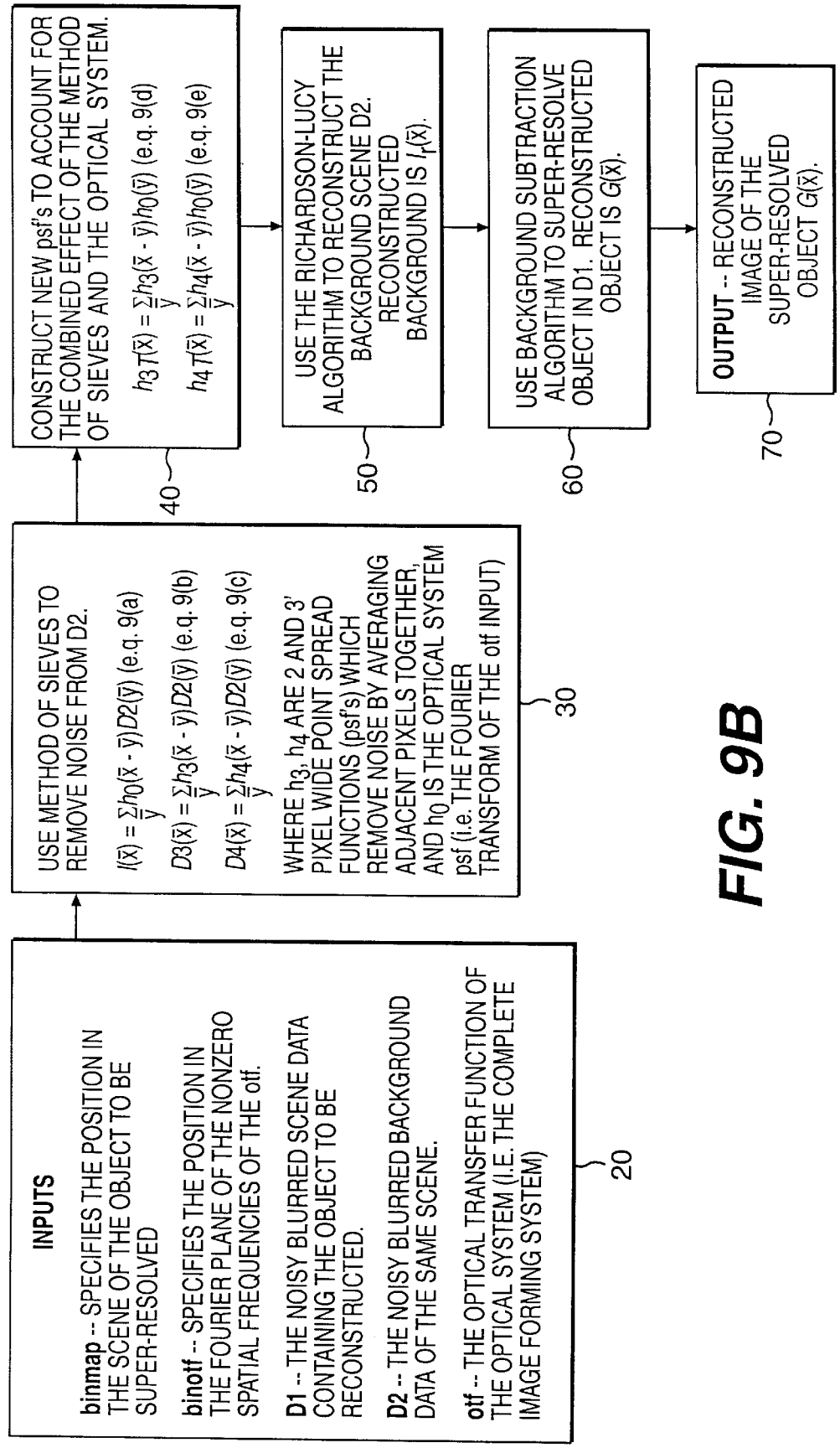

The Non-linear Background Reconstruction method using a modified Richardson-Lucy Enhancement Technique is described as follows. In FIG. 9A, there is shown a scene (10) comprising a localized object (20) such as a tractor within a noisy blurred background (30). In FIG. 9B, input data D2 (Block 20), representing the noisy blurred background data, is input into module 30 to remove the noise from D2 using a modified version of the method of sieves. Note that the input data D1 and D2 indicated in block 20 has been sampled at the Nyquist rate (5 times the customary image sampling rate) and preferably at twice the Nyquist rate (ten times the customary sampling rate)to obtain robust input data.

The modified method of sieves removes noise by averaging adjacent pixels of the noisy blurred background data D2 of the same scene together, using two and three pixel wide point spread functions. Array $h_0$ in equation (9a) of module 30 represents the optical system PSF, which is the Fourier transform of the OTF input.

The output of module 30 thus provides separate pictures the optical system image I(x) and the modified background data images D3(x) and D4(x). As shown in block 40, new point spread functions $h_{3T}$ and $h_{4T}$ have been constructed to account for the combined effect of the method of sieves and the optical system. These new point spread functions use both the two and three pixel wide point spread functions, $h_3$ and $h_4$, previously identified, as well as the optical system PSF $h_0$, as shown in equation 9(d) and (e),to arrive at the new PSF's.

Figure 10:
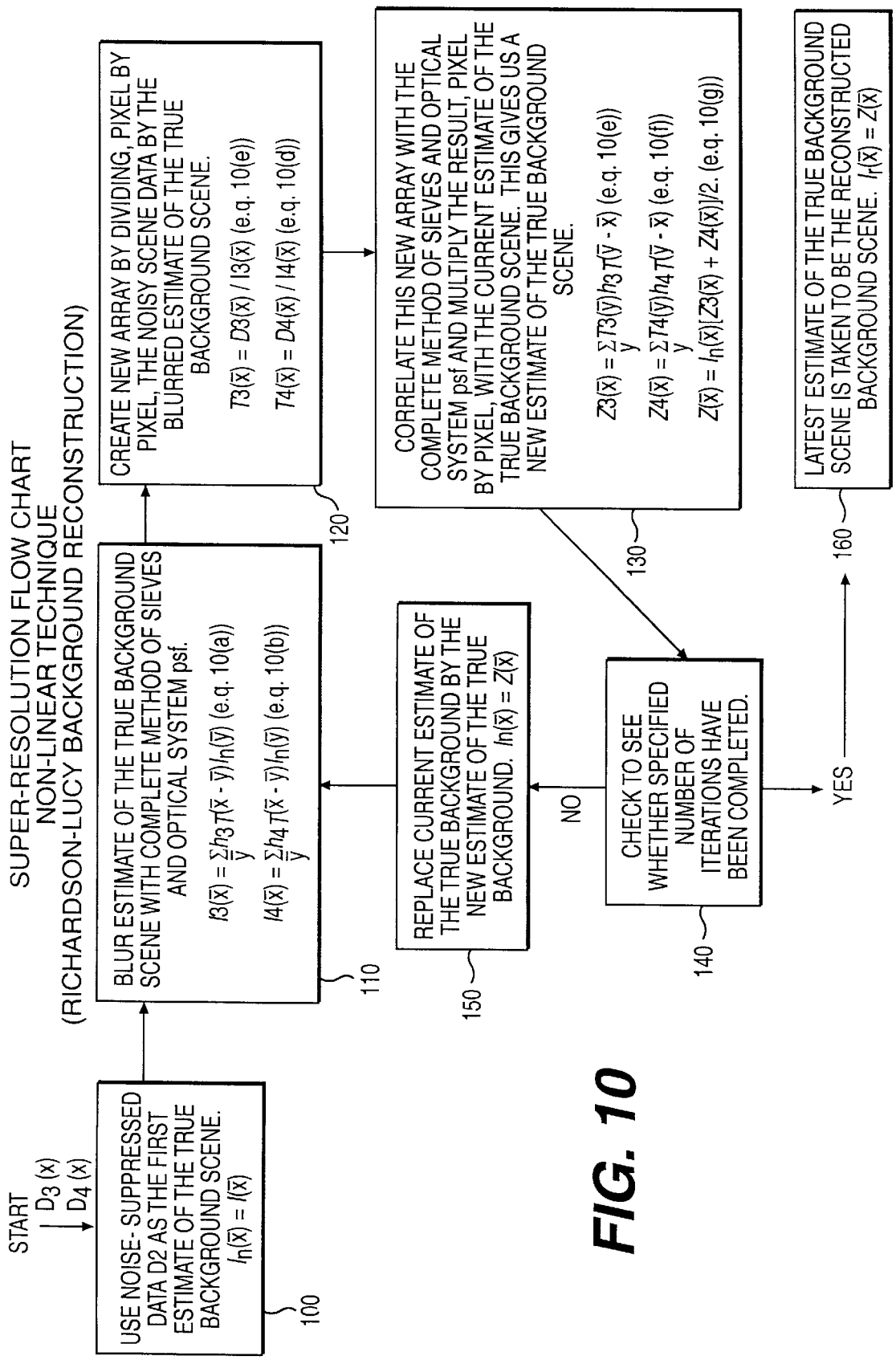
FIG. 10 is a diagram illustrating the Richardson-Lucy background reconstruction portion of the non-linear image processing technique according to the present invention.

As shown in block 50, the Richardson-Lucy method is then used to reconstruct the background scene data, D2, with the reconstructed data defined to be $I_r(x)$. FIG. 10 shows an exploded view of the processing steps for reconstructing the background scene to obtain the reconstructed background $I_r(x)$ In FIG. 10 the noise suppressed data D2 from block 20 of FIG. 9B, is used as the first estimate of the true background scene, $I_{r_0}(x)$ (Module 100). As shown in module 110, this estimate of the true background scene is then blurred using the combined method of sieves and optical system point spread functions to obtain two picture representations I3(x) and I4(x), where I3(x) is given by equation 10(a) and I4(x) is given by equation 10(b). Two new arrays, as shown in module 120, are then created by dividing pixel by pixel the noisy scene data, D3(x) and D4(x), by the blurred estimate of the true background scene, I3(x) and I4(x), as shown in equations 10(c) and (d) respectively. The new arrays T3(x) and T4(x) are then correlated with the combined method of sieves and optical system PSF's and the result is multiplied pixel by pixel with the current estimate of the true background scene. In this manner a new estimate of the true background scene, Z(x), is obtained as shown in module 130 and by equations 10 (e)–(g).

The processor then determines whether a predetermined number of iterations have been performed, as shown in block 140. If the predetermined number has not been performed, the current estimate of the true background is replaced by the new estimate of the true background (Z(x)) and the processing sequence of modules 110–140 are repeated. If, however, the predetermined number has been reached, then the latest estimate of the true background scene is taken to be the reconstructed background scenes; that is, $I_r(x)$ is taken to equal Z(x) as shown in block 160. Note that for the optical systems described above the predetermined number of iterations is preferably between one thousand and two thousand.

In FIG. 9B the reconstructed background $I_r(x)$ (equal to Z(x)) is then input to module 60, where the background subtraction steps are performed to super-resolve the object within the noisy blurred scene data (D1). The reconstructed object, G(x), which has been super-resolved, is then output as shown in module 70.

Figure 11:
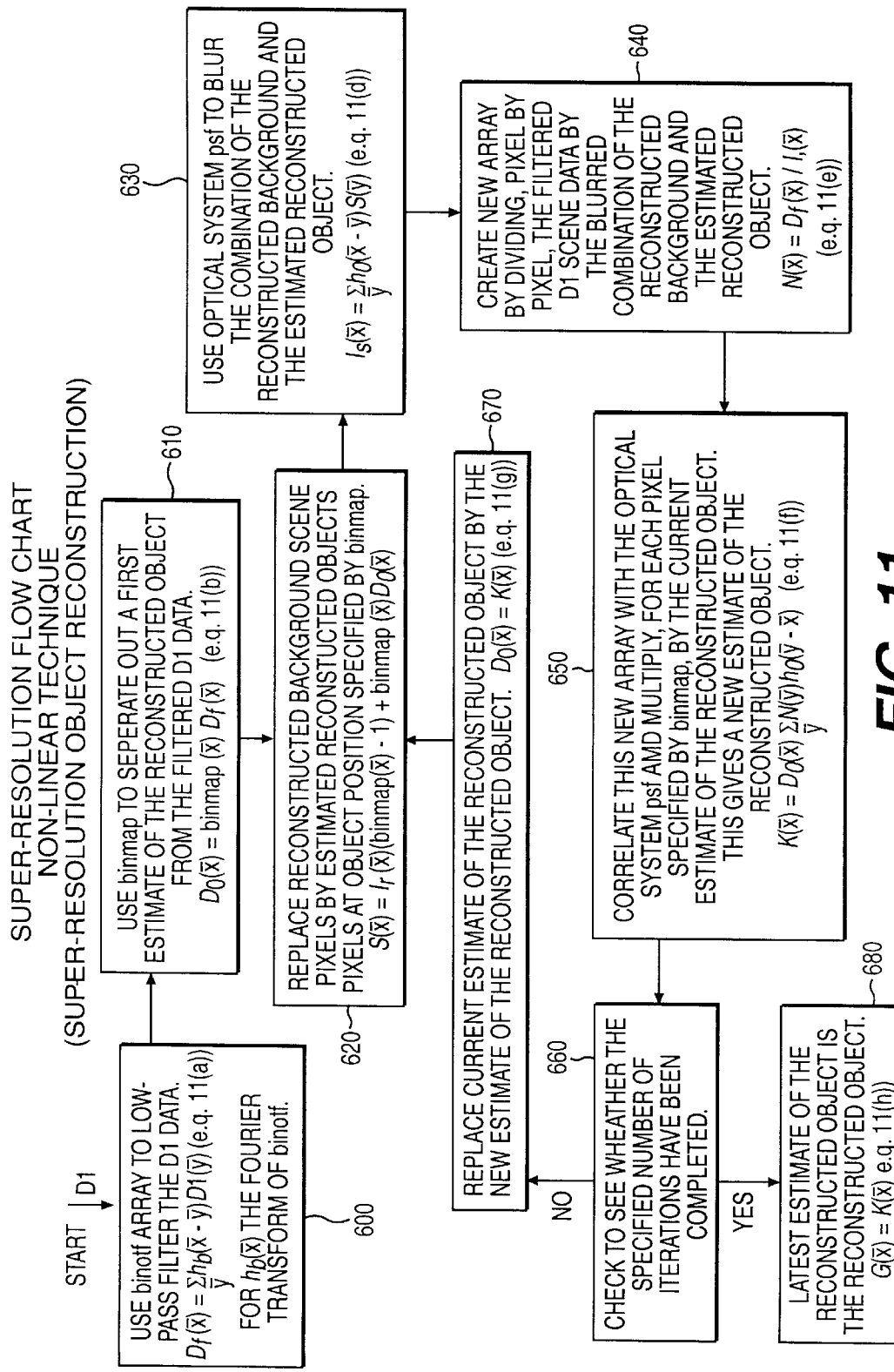
FIG. 11 is a diagram illustrating the Object Reconstruction and background subtraction portion of the non-linear image processing according to the present invention.
Figure 12:
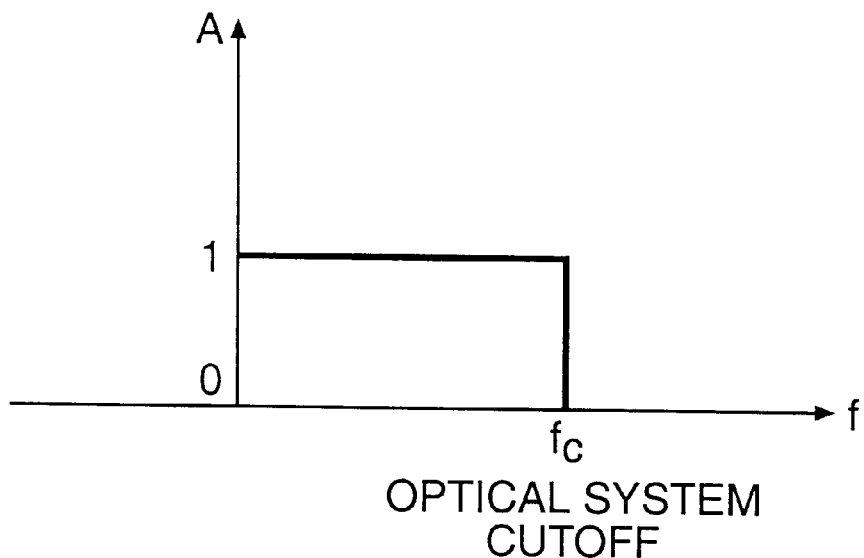
FIG. 12 is a schematic illustrating the Fourier Transform characteristic of binotf.

The background subtraction method for super-resolving the object of interest in D1 is detailed in FIG. 11. In FIG. 11 the noisy blurred scene data D1 containing the object to be reconstructed is used as input, with a low-pass filter (block 600) applied to remove high spatial frequency noise from the D1 data as shown by equation 11(a). In equation 11(a) the transfer function $h_b(x)$ represents the Fourier transform of the binotf array. The binotf array specifies the non-zero spatial frequency of the otf located in the fourier plane. FIG. 12 shows the fourier transform of an image depicting binotf to ensure no higher frequencies in the spectrum exist.

Figure 13:
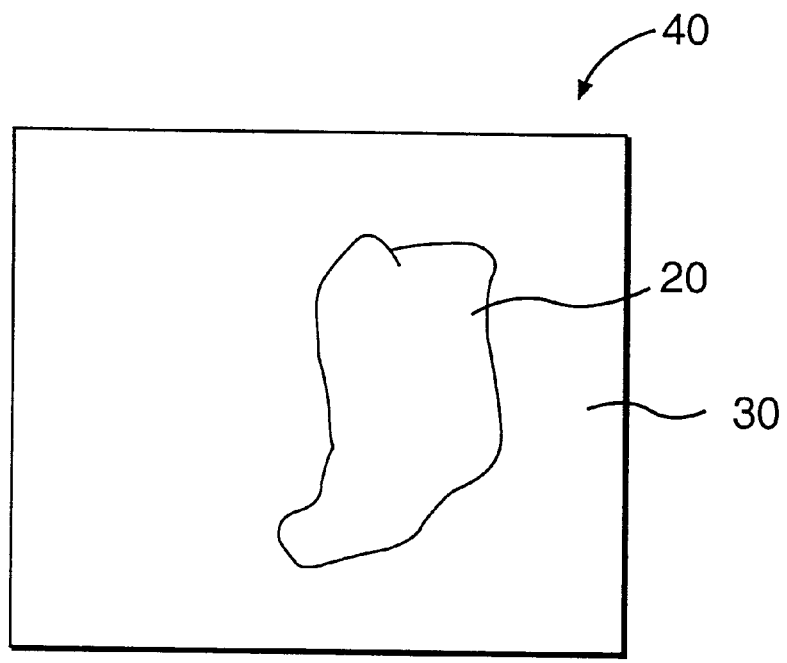
FIG. 13 is a schematic of the relationship of binmap to the object of interest within a window of a particular scene according to the present invention.
Figure 14A:
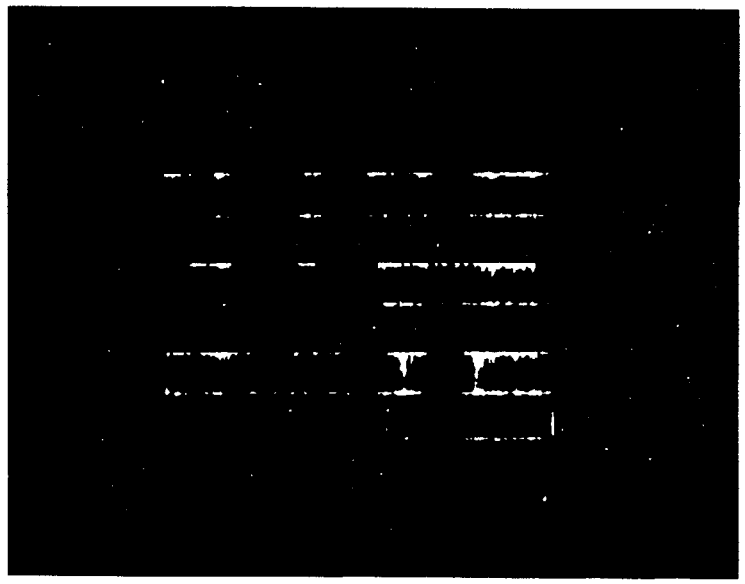
FIGS. 14A–D show the effects of super-resolution of simulated bar targets using the non-linear reconstruction technique according to the present invention.
Figure 14B:
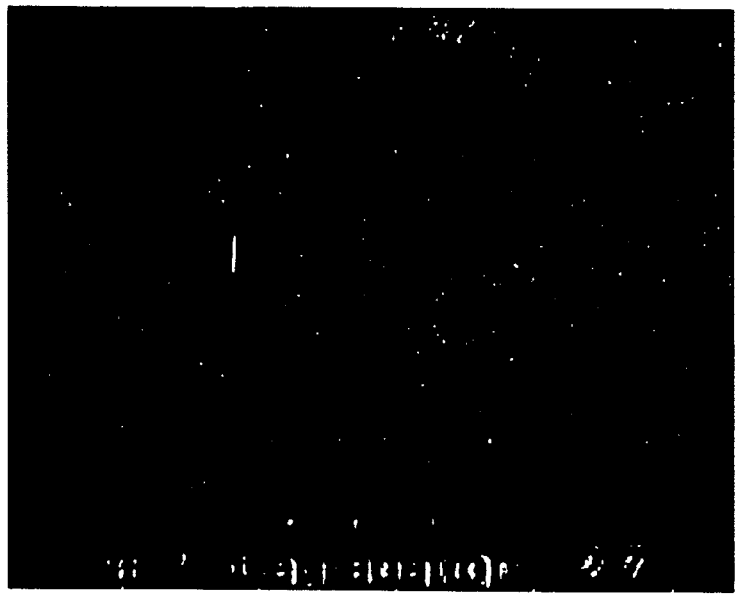
Figure 14C:
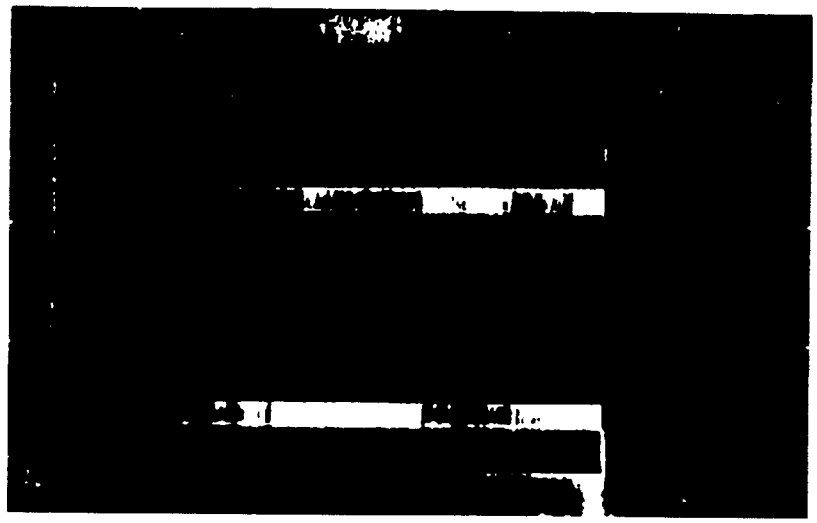
Figure 14D:
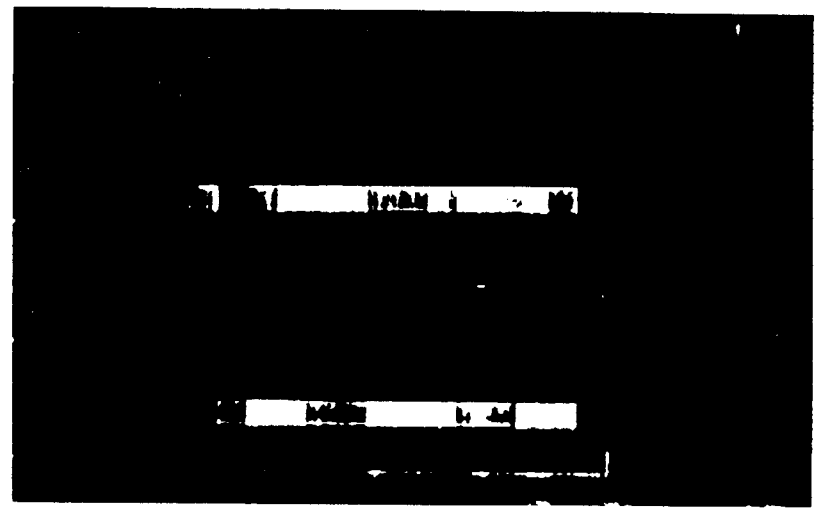
Figure 15B:
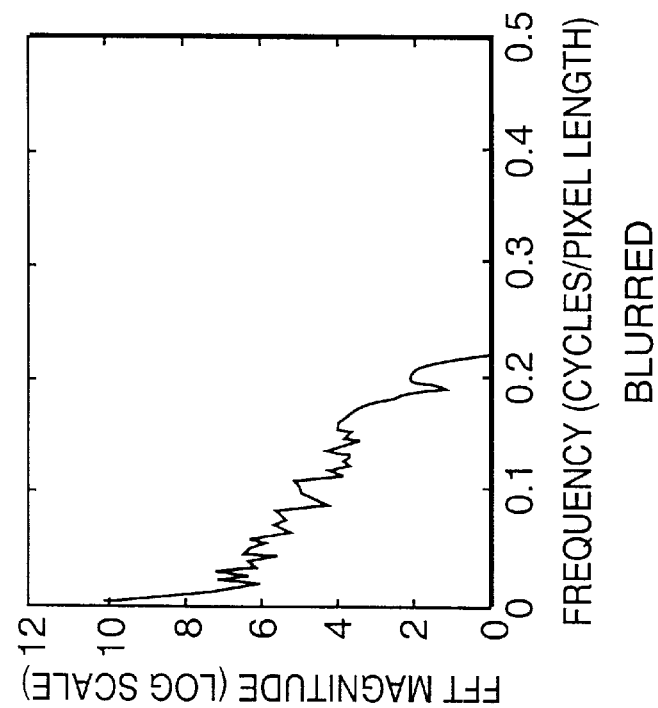
FIGS. 15A–D show the Fourier analysis of simulated bar targets associated with FIGS. 14A–D.
Figure 15A:
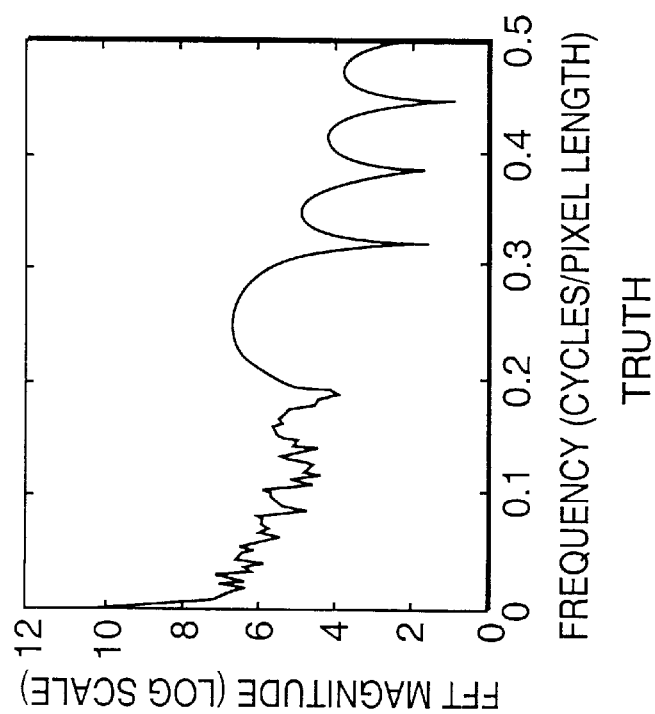
Figure 15D:
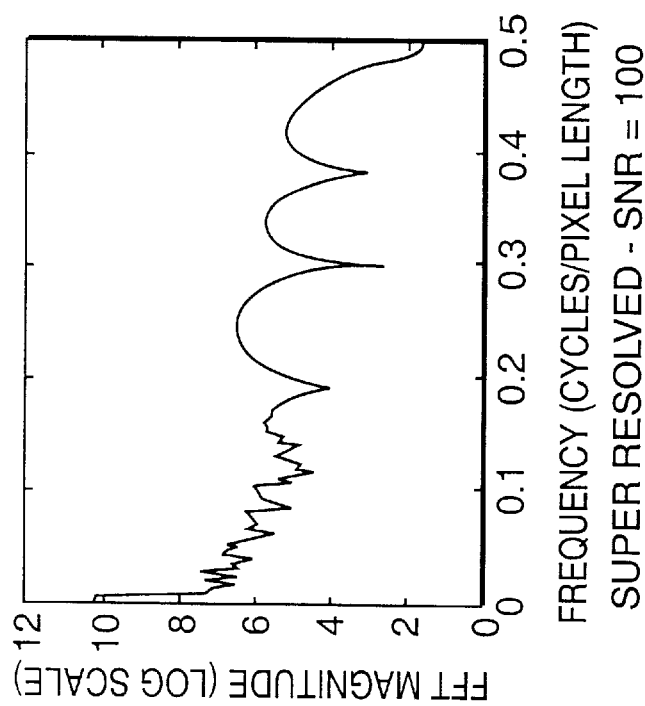
Figure 15C:
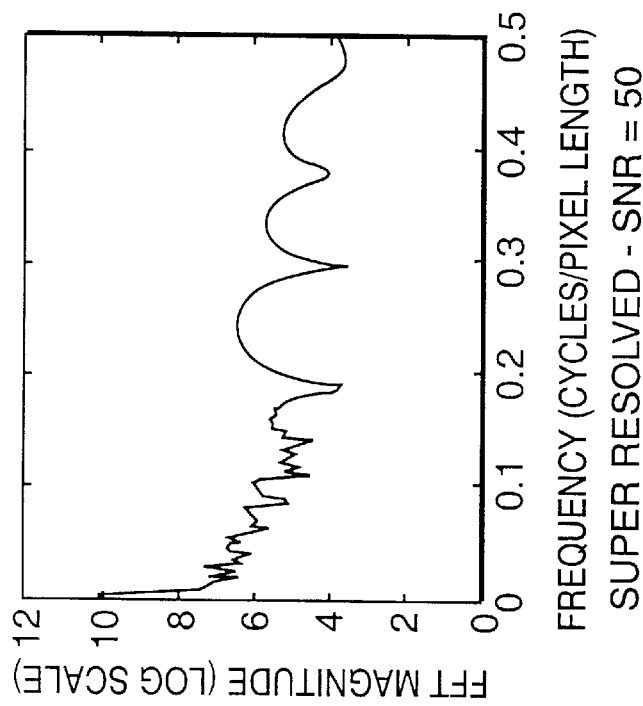

As shown in FIG. 12, the values of binotf are 1 up to the optical system cutoff value $f_c$ and 0 beyond that cutoff. The low pass filtered data $D_f(x)$ in FIG. 11 is then multiplied pixel by pixel with the bin map array (binmap (x)) to separate out a first estimate of the reconstructed object from the filtered D1 data, as shown in equation 11(b) in module 610. The binmap array specifies the region in the scene containing the object to be super-resolved. The binmap has array elements equal to 1 where the object of interest is located and array elements equal to 0 everywhere else. FIG. 13 shows a pictorial representation of the binmap array, where the binmap window (40) holds a region containing an object of interest (20) consisting of pixels equal to one in the region containing the object and pixels equal to zero everywhere else (30).

The next step in FIG. 11 is to replace the reconstructed background scene pixels, $I_r(x)$, by the estimated reconstructed object pixels, $D_0(x)$, at object positions specified by the binmap (40), as shown in module 620. Equation 11© provides the mathematical formula for this replacement, creating a reconstructed object array S(x). S(x) is then convolved with the optical system PSF ($h_0$) to blur the combination of the reconstructed background and the estimated reconstructed object as shown in equation 11(d) of module 630. A new array, N(X), is then created in block 640 by dividing, on a pixel by pixel basis, the filtered D1 scene array ($D_f$) by the blurred combination of the reconstructed background and the estimated reconstructed object ($I_s$) as shown in equation 11(e) of module 640. The new array, N(x), is then correlated with the optical system PSF ($h_0$) and multiplied, for each pixel specified by binmap, by the current estimate of the reconstructed object. Equation 11(f) of module 650 is then used to determine K(x), the new estimate of the reconstructed object.

After K(x) has been calculated a check is made, as shown in module 660, to determine whether the specified number of iterations have been completed. If more iterations are needed the current estimate of the reconstructed object is replaced by the new estimate as shown by equation 11(g) of module 670. Steps 620–660 are repeated until the specified number of iterations have been accomplished. When this happens the latest estimate of the reconstructed objects is taken to be the reconstructed object; that is G(x) is set equal to K(x), as shown in module 680 (equation 11H).

In FIG. 9B the reconstructed object G(x) is the output of module 70. This G(x) is in fact the desired super-resolved object. Note that the above description of the super-resolution method as shown in FIG. 11 is set up to handle non-thinned apertures. For thinned aperture systems, step 630 of FIG. 11 (in which the new scene $I_s(x)$ is blurred again using the optical system's PSF) may be excluded.

Three examples of applying the background reconstruction approach using the above-described non-linear technique to obtain super-resolution are illustrated in FIGS. 14–16. FIGS. 14A–D represent simulated bar target charts where FIG. 14A represents the truth scene illustrated by a series of alternating dark and light bands within a background. FIG. 14B represents the blurred image of the truth scene (through a small aperture), and FIGS. 14C and 14D represent the reconstructed images using the non-linear background reconstruction method previously described. FIGS. 15A–D are associated respectively with FIGS. 14A–D and represent a one-dimensional Fourier transform cut through each of the "scenes", thus clearly illustrating the spatial frequencies that have been restored to the reconstructed image.

FIGS. 16A–C represent the application of the non-linear method to a thinned aperture system. In this case, the thinned aperture configuration is an annulus. It should be noted, however, that the method may be utilized with any thinned aperture design. FIG. 16A represents a computer generated ground scene (i.e. the truth scene). The blurred image of that scene is then depicted in FIG. 16B, while the final reconstructed, super-resolved image is shown in FIG. 16C.

Figure 17F:
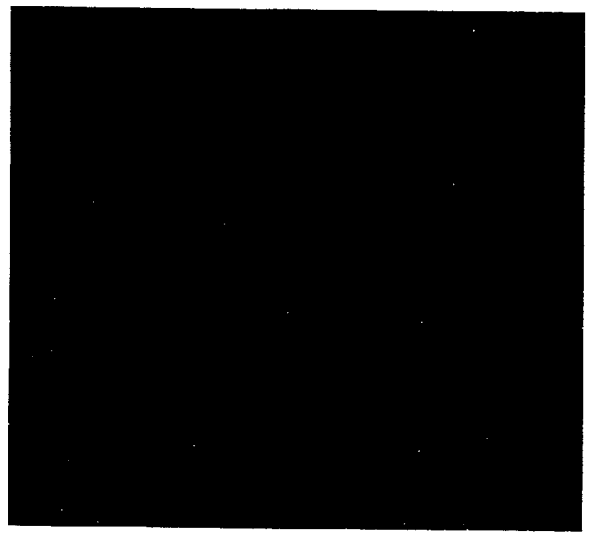
FIGS. 17D–F show the Fourier image analysis of the image of FIGS. 17A–C.
Figure 17E:
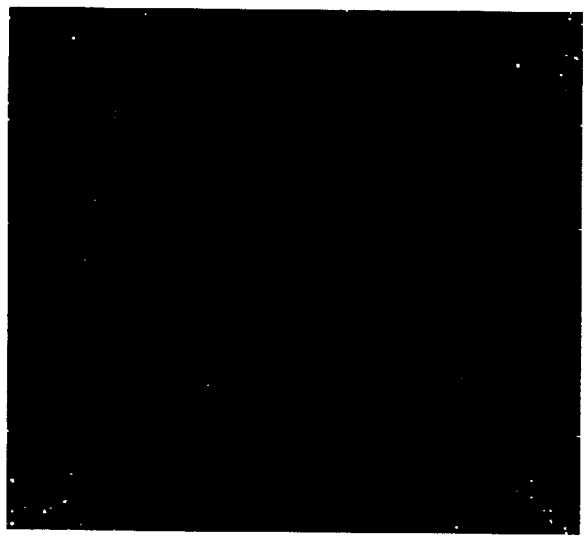
Figure 17D:
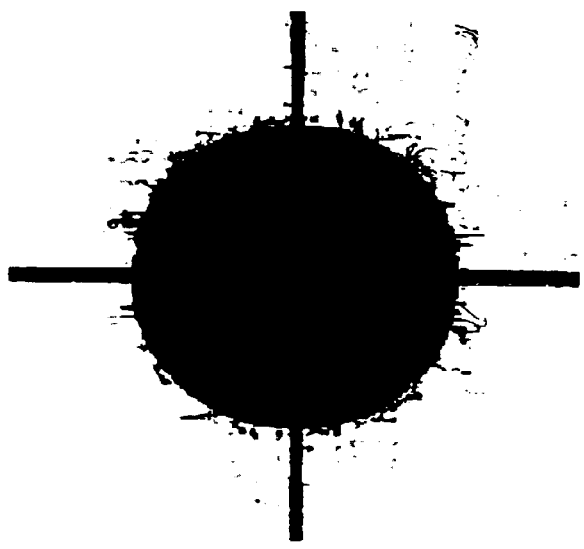
Figure 18B:
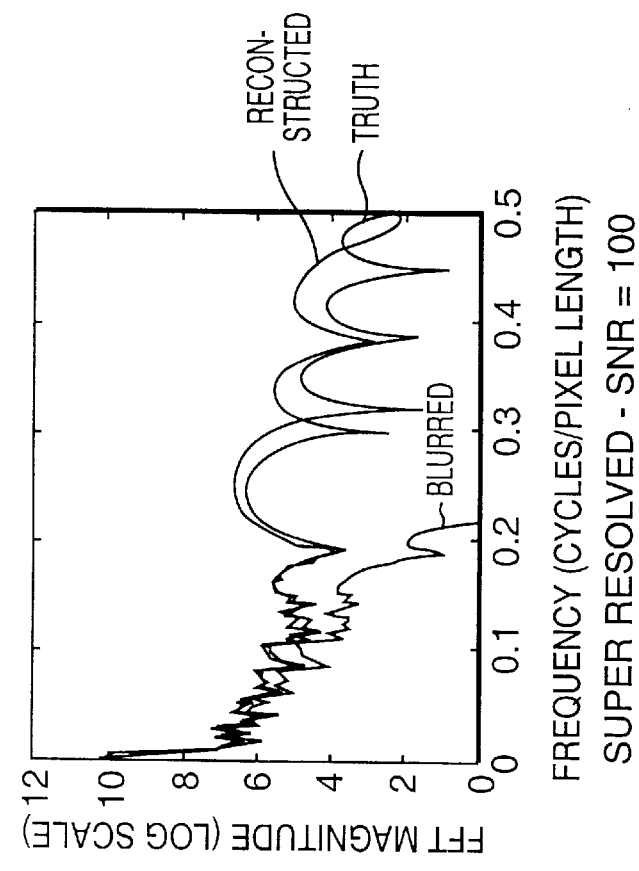
FIGS. 18A–B show the Fourier analysis of superimposed truth, blurred, and reconstructed images as function of frequency for SNR values of 50 and 100, respectively.
Figure 18A:
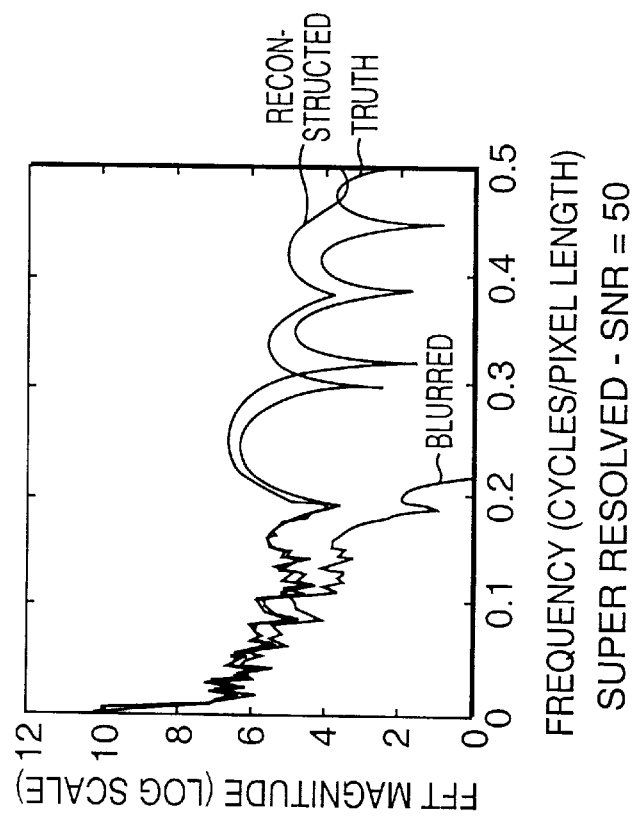

FIGS. 17A–C represent images of figures taken from a CCD camera. FIG. 17A represents the truth scene (a picture of a toy spacemen), while FIG. 17B shows the blurred image of the scene (observed through a small aperture). FIG. 17C represents the reconstructed image, and FIG. 17D shows the magnitude of the difference of the two-dimensional Fourier transform between the truth scene in FIG. 17A and the blurred image of FIG. 17B. FIG. 17E shows the difference between the truth scene and the first stage of reconstruction (i.e. the deconvolved figure), while FIG. 17F shows the magnitude of the difference of the two-dimensional Fourier transform and the truth scene for the reconstructed, super resolved image. Note that black indicates a 0 difference, which is the desired result, while white indicates a maximum difference. As one can see from a comparison of FIGS. 17D, E and F, the radius of FIG. 17D corresponds to the cutoff of the optical system or camera, and the deconvolved image frequencies in FIG. 17E have been enhanced inside the cutoff but remain zero outside the cutoff. The super-resolved figure in FIG. 17F has further improved the image by restoring frequencies outside the cutoff as can be shown by the increased blackness of the figure with respect to either FIGS. 17D or 17E. This is a clear demonstration that super resolution has occurred. FIGS. 18A–B represent a graphical illustration of the truth, blurred, and reconstructed super-resolved images for SNR values of 50 and 100 respectively. FIGS. 18A and B show that the non-linearly reconstructed images closely parallel the truth images.

In an alternative embodiment, the reconstruction approach using a linear transformed method is now described. When reconstructing either the background scene or the localized object, the imaging system is mathematically characterized by a linear operator represented by a matrix. To restore either a background scene or the localized object, an inverse imaging matrix corresponding to the inverse operator must be constructed. However, due to the existence of system noise, applying the inverse imaging matrix to the image is intrinsically unstable and results in a poorly reconstructed image. However by applying a constrained least squares procedure such as Tikhonov regularization, a regularized pseudo-inverse (RPI) matrix may be generated. Zero-order Tikhonov regularization is preferably used, although higher order Tikhonov regularization may sometimes give better results. The details of this are not described here, as Tikhonov regularization is well-known in the art.

A key quantity used to construct the RPI matrix is the regularization parameter which controls the image restoration. Larger parameter values protect the restored image from the corrupting effects of the optical system but result in a restored image which has lower resolution. An optimum or near optimum value for the regularization parameter may be derived automatically from the image data. Singular value decomposition (SVD) of the imaging operator matrix may be used to compute the RPI matrix. By estimating the noise or error level of the degraded image the singular values of the matrix determine the extent to which the full information in the original scene may be recovered. Note that the use of the SVD process is not essential in determining the RPI matrix, and other methods such as QR decomposition of the imaging matrix may also be used to achieve essentially the same result.

The imaging matrix size increases approximately as the square of the image size, and the computational burden associated with forming the RPI of the imaging matrix quickly becomes intolerable. However, in the special case that the image and object fields are the same size and are sampled at the same intervals (as is the case here), the imaging matrix can be expanded into circulant form by inserting appropriately positioned, additional columns. A fundamental theorem of matrix algebra is that the Fourier transform diagonalizes a circulant matrix. This allows the reduction of the image reconstruction algorithm to a pair of one dimensional fast Fourier transforms, followed by a vector—vector multiplication, and finally an inverse one dimensional fast Fourier transform. This procedure allows the image restoration by this Tikhonov regularization technique to be done entirely in the Fourier transform domain, dramatically reducing the time required to compute the reconstructed image. FIG. 19 provides an illustration of the steps taken to obtain the reconstructed image using the linear transform method.

A flow diagram of the Linear Algebra Technique according to the present invention is shown in FIG. 19. Referring now to FIG. 19, the technique first converts the imaging data collected by the optical system of the sensor into a matrix of the form $g_1(i,j)=\Sigma_m\Sigma_n h(I-m,j-n)f(m,n)+n_1(i,j)$, where h is a matrix representation of the point spread function of the optical system and f is the matrix representation of the unblurred background with the embedded object, while $n_1$ is the matrix representation of the additive white noise associated with the imaging system (module 12). Next, imaging data $g_2$ comprising the image scene data which contains only the background data is obtained in the form of $g_2(i,j)=\Sigma_m\Sigma_n h(I-m,j-n)b(m,n)+n_2(i,j)$ where b is a matrix representation of the unblurred background data taken alone and $n_2$ is a matrix representation of additive system white noise (module 14). Both $g_1$ and $g_2$ are then low-pass filtered to the cut-off frequency of the optical system to reduce the effects of noise (module 15). Module 16 then shows the subtraction step whereby the matrix representation ($g_3$) of the difference between blurred scene data containing the background and object of interest ($g_1$) and the blurred scene containing only the background data ($g_2$) is formed as ($g_1-g_2$). Next, the position and size of the object of interest is specified by choosing x,y coordinates associated with image matrix ($g_1-g_2$) (module 18). A segment of sufficient size to contain the blurred object in its entirety is then extracted from the matrix representation of ($g_1-g_2$), as shown in Module 20. That is, an area equal to the true extent of the local object plus its diffracted energy is determined. An identically located segment (i.e. segment having the same x,y coordinates) is extracted from the blurred background scene matrix $g_2$ as shown in module 22. The two image segments output from module 15 and 20 are then input to module 24 to restore $g_2$ and ($g_1-g_2$) using nth order Tikhonov regularization. The restored segments are then added together as shown in step 26; and the area containing the restored object of interest is extracted therefrom, as shown in module 28.

The resulting reconstructed image includes much of the spatial resolution which was lost due to diffraction blurring effects.

It should be noted that the present invention is not limited to any one type of optical sensor device. The principles which have been described herein apply to many types of applications which include, but are not limited to, Optical Earth Resource Observation Systems (both Air and Spaceborne), Optical Weather Sensors (both Air and Spaceborne), Terrain Mapping Sensors (both Air and Spaceborne), Surveillance Sensors (both Air and Spaceborne), Optical Phenomenology Systems (both Air and Spaceborne), Imaging Systems that utilize optical fibers such as Medical Probes, Commercial Optical Systems such as Television Cameras, Telescopes utilized for astronomy and Optical Systems utilized for Police and Rescue Work.

While the invention has been particularly shown and described with reference to preferred embodiments thereof, it will be understood by those skilled in the art that changes in form and details may be made therein without departing from the spirit and scope of the present invention.

What is claimed is:

1. In an optical system having a detector means and processor means in which image data is obtained comprising noisy blurred scene data containing an object to be reconstructed (D1), and noisy blurred background data (D2) of the same scene, an improved method for increasing the spatial resolution of the imaging data produced by the diffraction limited optical system, the improvement therewith comprising:

filtering the noisy blurred background data (D2) of the same scene to obtain noise suppressed data;

applying estimations of point spread functions associated with the noise suppressed data and optical system and to estimates of the noise suppressed data to obtain a reconstructed background image ($I_r(x)$); and low pass filtering the noisy blurred scene data containing the object to be reconstructed (D1) and using the reconstructed background image ($I_r(x)$) to eliminate the background data from said image data to obtain a reconstructed image of the object with increased spatial resolution.

2. In an optical system having a detector means and processor means in which image data is obtained comprising noisy blurred scene data containing an object to be reconstructed (D1), and noisy blurred background data (D2) of the same scene, an improved method for increasing the spatial resolution of the imaging data produced by the diffraction limited optical system, the improvement therewith comprising:

filtering the noisy blurred background data (D2) of the same scene to obtain noise suppressed data;

applying estimations of point spread functions associated with the noise suppressed data and optical system in the noise suppressed data to obtain a reconstructed background image ($I_r(x)$); and low pass filtering the noisy blurred scene data containing the object to be reconstructed (D1) and using the reconstructed background image ($I_r(x)$) to eliminate the background data from said image data to obtain a reconstructed image of the object with increased spatial resolution;

wherein the step of filtering to remove noise from D2 comprises using the modified method of sieves to remove said noise, using the equations:

$$I(x)=\Sigma_y h_0(x-y)D2(y)$$

$$I(x)=\Sigma_y h_3(x-y)D2(y)$$

$$I(x)=\Sigma_y h_4(x-y)D2(y)$$

where $h_3$ and $h_4$ are two and three pixel wide point spread functions for removing noise by averaging adjacent pixels together, and where $h_0$ represents the optical system point spread function.

3. The method according to claim 1, wherein the reconstructed background $I_r(x)$ is obtained using the Richardson-Lucy reconstruction technique.

4. The method according to claim 2, further comprising reconstructing new point spread functions ($h_{3T}$, $h_{4T}$) to account for the combined effect of the method of sieves two and three pixel wide point spread functions, and the optical system point spread functions.

5. The method according to claim 4, wherein the step of reconstructing the background $I_r(x)$ further comprises:
   a) estimating the true background scene data;
   b) blurring the estimate of the true background scene data;
   c) dividing on a pixel by pixel basis the noisy scene data (D3, D4) by the blurred estimate of the true background scene data to create a new array (T3, T4);
   d) correlating said new array with the complete method of sieves and optical system point spread functions and multiplying the result on a pixel by pixel basis with the current estimate of the true background scene data to provide a new estimate of said true background scene Z(x); and
   e) taking the new estimate of the true background scene to be the reconstructed background scene ($I_r(x)$).

6. The method according to claim 5, further comprising the step of determining whether a threshold number of iterations has been met and repeating substeps b–e of claim 5 until said threshold is achieved.

7. The method according to claim 5, wherein the noise suppressed values D3 and D4 are used as the first estimate of the true background scene.

8. The method according to claim 5, wherein the step of correlating the new array to obtain a new estimate of the true background scene further comprises using said new point spread functions, $h_{3T}$ and $h_{4T}$, where $$Z3(x)=\Sigma_y T3(y)h_{3T}(y-x)$$

$$Z4(x)=\Sigma_y T4(y)h_{4T}(y-x)$$

$$Z(x)=I_n(x)[Z3(x)+Z4(x)]/2.$$

9. In an optical system having a detector means and processor means in which image data is obtained comprising noisy blurred scene data containing an object to be reconstructed (D1), and noisy blurred background data (D2) of the same scene, an improved method for increasing the spatial resolution of the imaging data produced by the diffraction limited optical system, the improvement therewith comprising:
   filtering the noisy blurred background data (D2) of the same scene to obtain noise suppressed data;
   applying estimations of point spread functions associated with the noise suppressed data and optical system in the noise suppressed data to obtain a reconstructed background image ($I_r(x)$); and
   low pass filtering the noisy blurred scene data containing the object to be reconstructed (D1) and using the reconstructed background image ($I_r(x)$) to eliminate the background data from said image data to obtain a reconstructed image of the object with increased spatial resolution;
   wherein the step of eliminating the background data further comprises:
   a) separating out a first estimate $D_0(x)$, in reconstructed object data from the filtered D1 data;
   b) replacing reconstructed background scene pixels by estimated reconstructed object pixels at predetermined object positions to obtain an image indicative of the reconstructed background and estimated reconstructed object (S(x));
   c) blurring the combination of the reconstructed background and estimated reconstructed object to obtain a blurred image $I_s(x)$;
   d) dividing on a pixel basis the filtered D1 scene data by the blurred combination of the reconstructed background and estimated reconstructed object data to obtain a new array of image data N(x);
   e) correlating said new array N(x) with the optical system point spread function and multiplying for each pixel specified by the current estimate of the reconstructed object to provide a new estimate of said reconstructed object;
   f) taking the new estimate of the reconstructed object to be the reconstructed image of the object having increased spatial resolution.

10. The method according to claim 9, further comprising the step of determining whether a threshold number of iterations has been met and repeating steps b–f of claim 9 until said threshold is achieved.

11. The method according to claim 9, wherein the step of separating out a first estimate of the reconstructed object from the filter data D1, further comprises using binmap values specifying the position in a scene of the object to be resolved in combination with the filtered data ($D_f(x)$) to obtain $D_0(x)$, where $$D_0(x)=\text{binmap}(x) \cdot D_f(x).$$

12. The method according to claim 11, wherein the predetermined object positions for replacing the reconstructed background scene pixels by the estimated reconstructed object pixels S(x) are specified by the binmap values, where $$S(x)=I_r(x)(\text{binmap}(x)-1)+\text{binmap}(x)D_0(x).$$

13. The method according to claim 12, wherein the step of blurring the combination of the reconstructed background and estimated reconstructed object data uses the optical system point spread function, where $$I_s(x)=\Sigma_y h_0(x-y)S(y).$$

14. In an optical system having a detector means and processor means in which image data is obtained comprising noisy blurred scene data containing an object to be reconstructed (D1), and noisy blurred background data (D2) of the same scene, an improved method for increasing the spatial resolution of the imaging data produced by the optical system, the improvement therewith comprising:
   obtaining filtered data by filtering the noisy blurred background data (D2) of the same scene;

obtaining a reconstructed background image ($I_r(x)$) by applying estimations of point spread functions associated with the filtered data and the optical system to the filtered data; and low pass filtering the noisy blurred scene data containing the object to be reconstructed (D1) and eliminating the background data from said image data by using the reconstructed background image ($I_r(x)$), to obtain a reconstructed image of the object with increased spatial resolution.

15. The method according to claim 14 wherein the optical system is diffraction limited.

16. In an optical system having a detector means and processor means in which image data is obtained comprising noisy blurred scene data containing an object to be reconstructed (D1), and noisy blurred background data (D2) of the same scene, an improved apparatus for increasing the spatial resolution of the image data produced by the optical system, the improvement therewith comprising:

means for filtering the noisy blurred background data (D2) of the same scene to obtain noise suppressed data:
means for applying estimations of point spread functions associated with the noise suppressed data and optical system to the noise suppressed data to obtain a reconstructed background image ($I_r(X)$); and
means for low pass filtering the noisy blurred scene data containing the object to be reconstructed and using the reconstructed background image to eliminate the background data from the image data to obtain a reconstructed image of the object with increased spatial resolution.

17. The apparatus of claim 16 wherein said optical system has a numerical aperture and said detector means has at least five detectors spread across the central lobe of the diffraction pattern determined by said aperture.

18. The apparatus of claim 17 wherein the optical system is diffraction limited.

19. The apparatus of claim 16, wherein the reconstructed background $I_r(x)$ is obtained using a means for implementing the Richardson-Lucy reconstruction technique.

20. In an optical system having a detector means and processor means in which image data is obtained comprising noisy blurred scene data containing an object to be reconstructed (D1), and noisy blurred background data (D2) of the same scene, an improved apparatus for increasing the spatial resolution of the image data produced by the optical system, the improvement therewith comprising:

means for filtering the noisy blurred background data (D2) of the same scene to obtain noise suppressed data:
means for applying estimations of point spread functions associated with the noise suppressed data and optical system to the noise suppressed data to obtain a reconstructed background image ($I_r(X)$; and
means for low pass filtering the noisy blurred scene data containing the object to be reconstructed and using the reconstructed background image to eliminate the background data from the image data to obtain a reconstructed image of the object with increased spatial resolution;

wherein the means for filtering to remove noise from D2 comprises means for using the modified method of sieves to remove said noise, using the equations:

$I(x)=\Sigma_y h_0(x-y)D2(y)$ $D3(x)=\Sigma_y h_3(x-y)D2(y)$ $D4=\Sigma_y h_4(x-y)D2(y)$ where $h_3$ and $h_4$ are two and three pixel wide point spread functions for removing noise by averaging adjacent pixels together, and where $h_0$ represents the optical system point spread function.

21. The apparatus of claim 20, further comprising means for constructing new point spread functions ($h_{3T}$, $h_{4T}$) to account for the combined effect of the method of sieves two and three pixel wide point spread functions, and the optical system point spread functions.

22. The apparatus of claim 21, wherein said means to obtain the reconstructed background $I_r(x)$ further comprises:

(a) means for blurring the estimate of the true background scene data;

(b) means for dividing on a pixel by pixel basis the noisy scene data (D3, D4) by the blurred estimate of the true background scene data to create a new array (T3, T4);

(c) means for correlating said new array with the complete method of sieves and optical system point spread functions and multiplying the result on a pixel by pixel basis with the current estimate of the true background scene data to provide a new estimate of said true background scene $Z(x)$; and (d) means for taking a new estimate of the true background scene to be the reconstructed background scene $I_r(x)$.

23. The apparatus of claim 22, further comprising means for determining whether a threshold number of iterations has been met and repeating the steps of claim 22 until said threshold is achieved.

24. The apparatus of claim 22 wherein the optical system is diffraction limited.

25. The apparatus of claim 24 wherein said optical system has a numerical aperture and said detector means has at least five detectors spread across the central lobe of the diffraction pattern determined by said aperture.

26. The apparatus of claim 22, wherein the noise suppressed values D3 and D4 are used as the first estimate of the true background scene.

27. The apparatus of claim 22, wherein the means for correlating the new array to obtain a new estimate of the true background scene further comprises means for using said new point spread functions, $h_{3T}$ and $h_{4T}$, where $Z3(x)=\Sigma_y T3(y)h_{3T}(y-x)$ $Z4(x)=\Sigma_y T4(y)h_{4T}(y-x)$ $Z(x)=I_n(x)[Z3(x)+Z4(x)]/2.$ 28. In an optical system having a detector means and processor means in which image data is obtained comprising noisy blurred scene data containing an object to be reconstructed (D1), and noisy blurred background data (D2) of the same scene, an improved apparatus for increasing the spatial resolution of the image data produced by the optical system, the improvement therewith comprising:

means for filtering the noisy blurred background data (D2) of the same scene to obtain noise suppressed data:
means for applying estimations of point spread functions associated with the noise suppressed data and optical system to the noise suppressed data to obtain a reconstructed background image ($I_r(X)$; and
means for low pass filtering the noisy blurred scene data containing the object to be reconstructed and using the reconstructed background image to eliminate the background data from the image data to obtain a reconstructed image of the object with increased spatial resolution;

(a) means for separating out a first estimate, $D_0(x)$, of reconstructed object data from filtered D1 data;
(b) means for replacing reconstructed background scene pixels by estimated reconstructed object pixels at predetermined object positions to obtain an image indicative of the reconstructed background and estimated reconstructed object ($S(x)$);
(c) means for blurring the combination o the reconstructed background and estimated reconstructed object to obtain a blurred image $I_s(x)$;
(d) means for dividing on a pixel basis the filtered D1 scene data by the blurred combination of the reconstructed background and estimated reconstructed object data to obtain a new array of image data $N(x)$;
(e) means for correlating said new array $N(x)$ with the optical system point spread function and multiplying for each pixel specified by the current estimate of the reconstructed object to provide a new estimate of said reconstructed object; and
(f) means for taking the new estimate of the reconstructed object to be the reconstructed image of the object having increased spatial resolution.

29. The apparatus of claim 28, further comprising means for determining whether a threshold number of iterations has been met and repeating steps b–f of claim 28 until said threshold is achieved.

30. The apparatus of claim 29, wherein the means for separating out a first estimate of the reconstructed object from the filtered data D1 further comprises means for using binmap values specifying the position in a scene of the object to be resolved in combination with the filtered data ($D_f(x)$) to obtain $D_0(X)$, where $$D_0(x) = \text{binmap}(x) \cdot D_f(x).$$

31. The apparatus of claim 30, wherein the predetermined object positions for replacing the reconstructed background scene pixels by the estimated reconstructed object pixels $S(x)$ are specified by the binmap values, where $$S(x) = I_r(x)(\text{binmap}(x)-1) + \text{binmap}(x)D_0(x).$$

32. The apparatus of claim 31, wherein the means of blurring the combination of the reconstructed background and estimated reconstructed object data uses the optical system point spread function, where $$I_s(x) = \Sigma_y h_0(x-y) S(y).$$

33. The apparatus of claim 31 wherein the optical system is diffraction limited.

34. The apparatus of claim 33 wherein said optical system has a numerical aperture and said detector means has at least five detectors spread across the central lobe of the diffraction pattern determined by said aperture.

* * * * *